(12) United States Patent
Chung

(10) Patent No.: US 7,931,216 B2
(45) Date of Patent: Apr. 26, 2011

(54) DOUBLE VALVE SET

(76) Inventor: Kiosky Chung, Taichung (TW)

( * ) Notice: Subject to any disclaimer, the term of this patent is extended or adjusted under 35 U.S.C. 154(b) by 426 days.

(21) Appl. No.: 12/132,831

(22) Filed: Jun. 4, 2008

(65) Prior Publication Data

US 2009/0302134 A1   Dec. 10, 2009

(51) Int. Cl.
*A62C 31/02* (2006.01)
(52) U.S. Cl. ........ 239/390; 239/391; 239/574; 239/590; 239/591; 239/600; 126/25 R
(58) Field of Classification Search .................. 239/390, 239/391, 500, 550, 552, 574, 590, 591, 600; 126/25 B, 25 R
See application file for complete search history.

(56) References Cited

U.S. PATENT DOCUMENTS

| 936,537 | A | * | 10/1909 | Hull | 239/391 |
| 2,618,511 | A | * | 11/1952 | Wahlin | 239/550 |
| 3,799,453 | A | * | 3/1974 | Hart | 239/600 |
| 5,332,161 | A | * | 7/1994 | Schweitzer et al. | 239/390 |
| 5,415,348 | A | * | 5/1995 | Nelson | 239/391 |

* cited by examiner

*Primary Examiner* — Steven J Ganey

(57) ABSTRACT

A double valve set includes a housing, a first nozzle and a second nozzle. The housing includes an outlet tube formed thereon. The first nozzle is disposed in the outlet tube. When used alone, the first nozzle is adapted to transfer the natural gas. The second nozzle is detachably connected to the outlet tube. The second nozzle can be used to transfer the tanked gas without having to remove the first nozzle from the outlet tube.

1 Claim, 4 Drawing Sheets

DOUBLE VALVE SET

FIELD OF INVENTION

The present invention relates to a valve set and, more particularly, to a double valve set that can be used for the tanked gas and the natural gas.

BACKGROUND OF INVENTION

The combustion pressure of the tanked gas is different from that of the natural gas. A valve set for transferring the tanked gas to a burner is different from a valve set for transferring the natural gas to a burner. If buying a wrong valve, a user will have to ask for refund or replacement. Such refund or replacement is troublesome.

Generally, people use the tanked gas outdoors. Hence, an outdoor burner is generally equipped with a valve set adapted to transfer the tanked gas. On the other hand, there are outdoor sites such as market places where the natural gas is provided. In these sites, users prefer the natural gas to the tanked gas. For a user who has to move from one place to another very often, it would be better for him or her to bring two valve sets to ensure the proper operation of a burner. If forgetting to bring a valve for the natural gas, it would be troublesome to get one since the valves for the natural gas are sold only in a few places.

Therefore, the present invention is intended to obviate or at least alleviate the problems encountered in prior art.

SUMMARY OF INVENTION

It is the primary objective of the present invention to provide a double valve set for transferring the tanked gas and the natural gas.

To achieve the foregoing objective, the double valve set includes a housing, a first nozzle and a second nozzle. The housing includes an outlet tube formed thereon. The first nozzle is disposed in the outlet tube. When used alone, the first nozzle is adapted to transfer the natural gas. The second nozzle is detachably connected to the outlet tube. The second nozzle can be used to transfer the tanked gas without having to remove the first nozzle from the outlet tube.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 1:
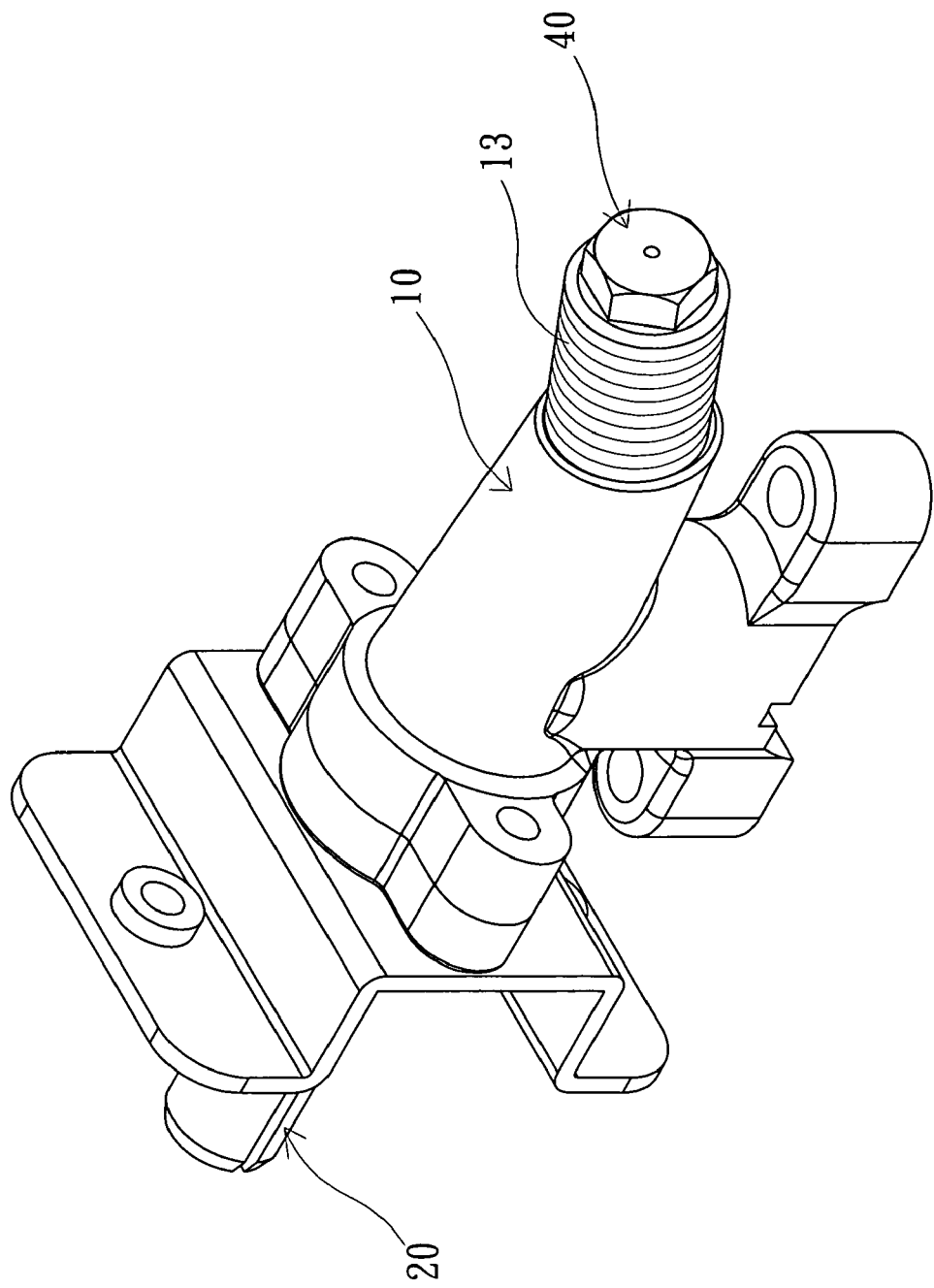
FIG. 1 is a perspective view of a double valve set according to the preferred embodiment of the present invention.
Figure 2:
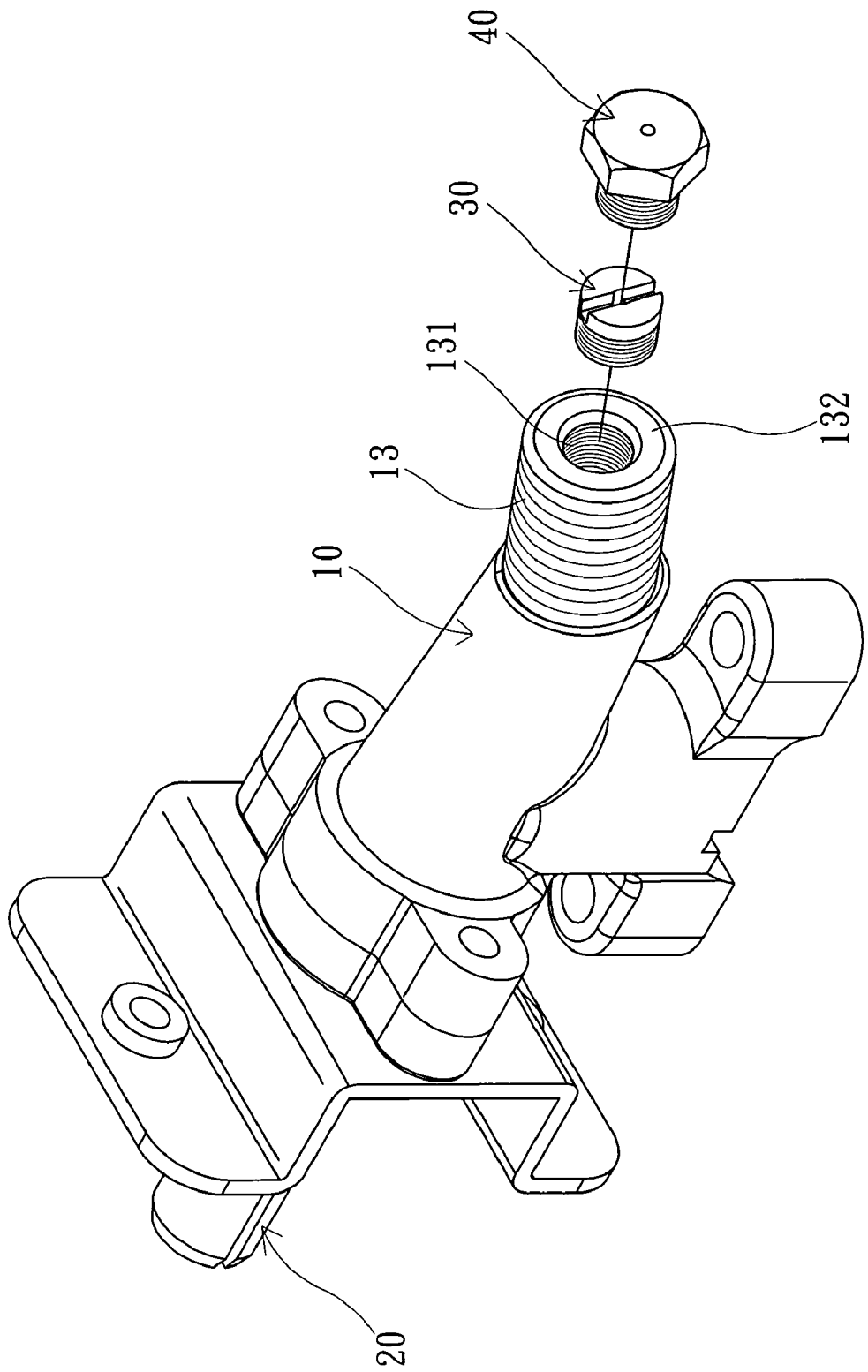
FIG. 2 is an exploded view of the double valve set shown in FIG. 1.
Figure 3:
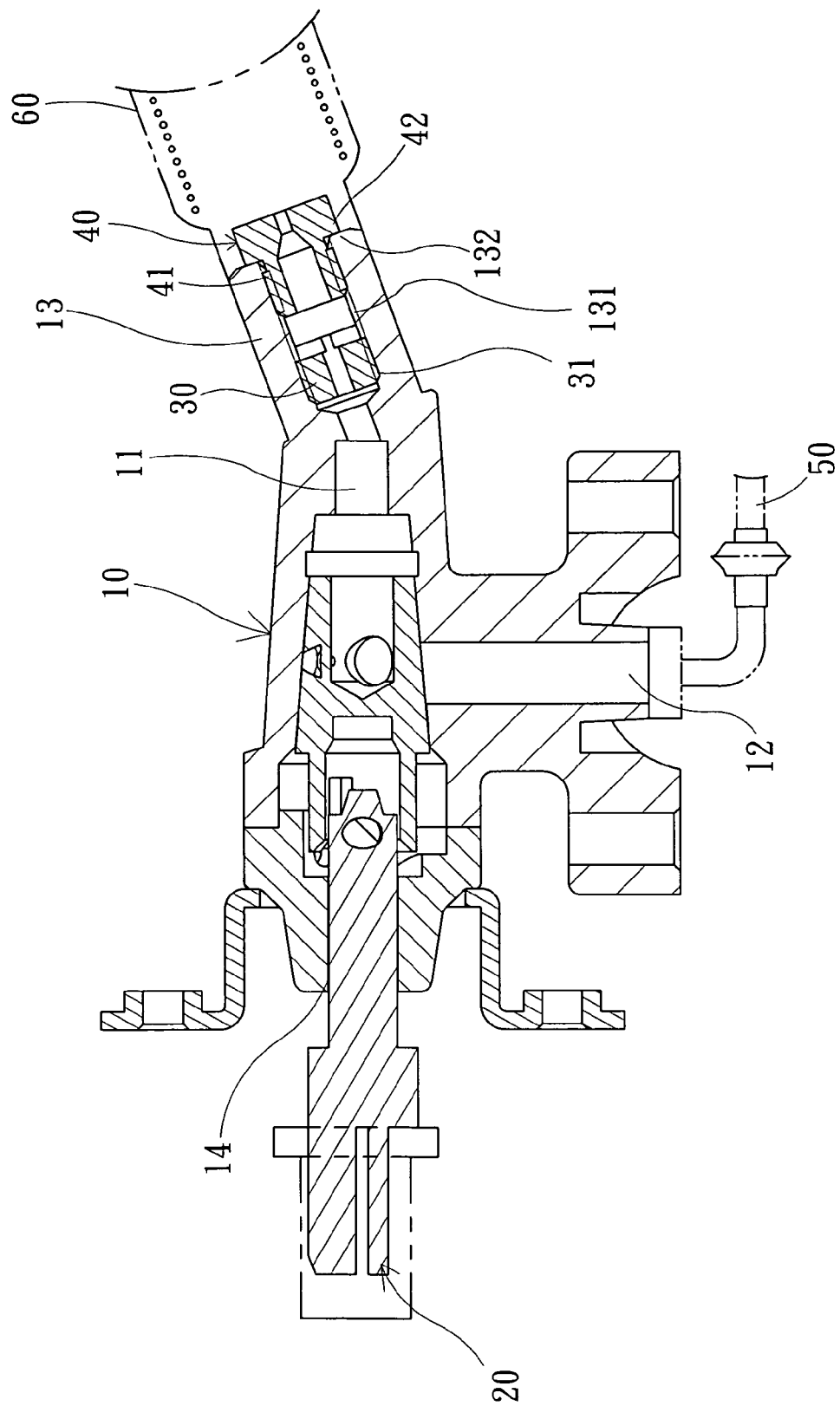
FIG. 3 is a cross-sectional view of the double valve set of FIG. 1.
Figure 4:
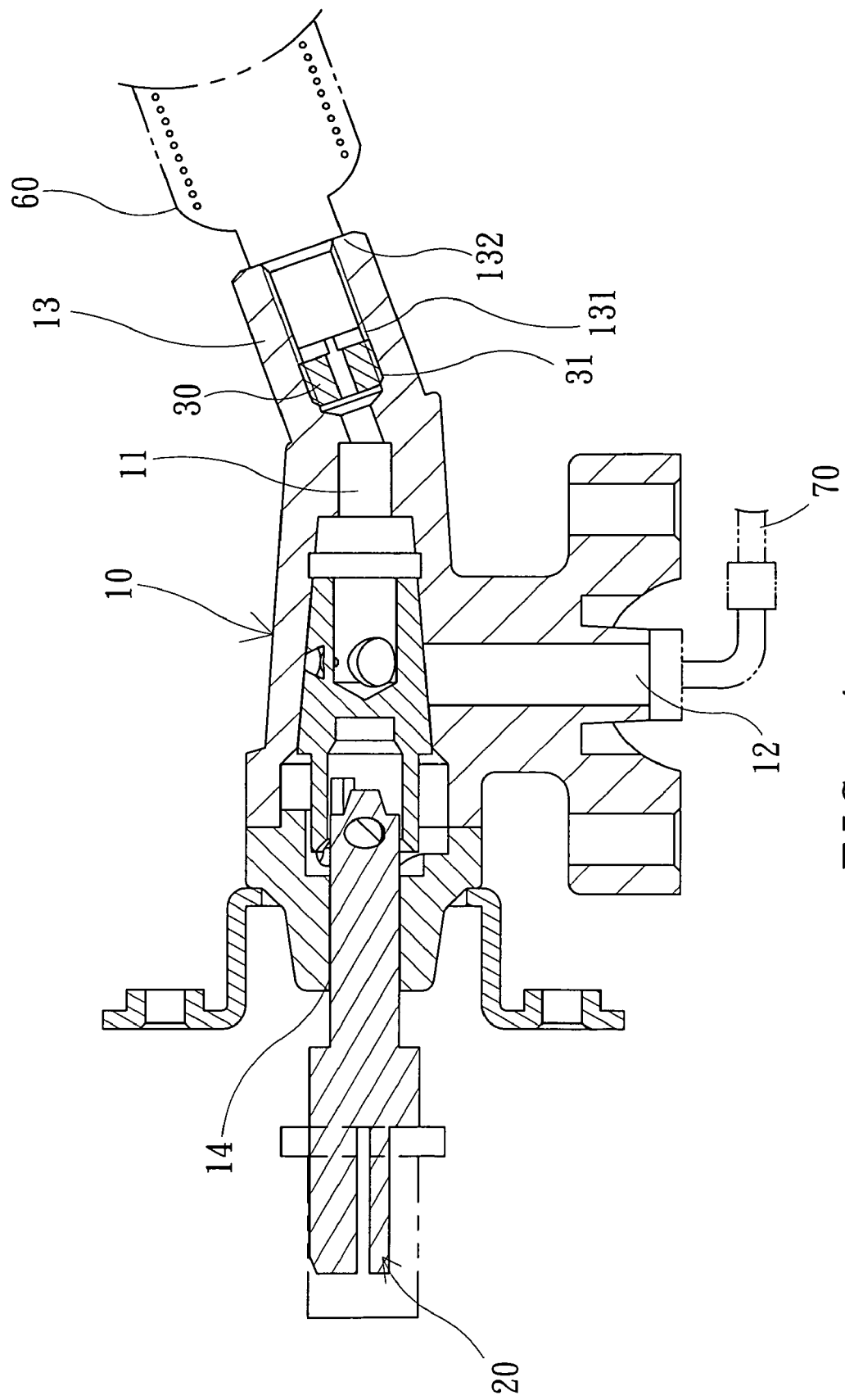
FIG. 4 is a cross-sectional view of the double valve set in another mode than shown in FIG. 3.

Referring to FIGS. 1 and 2, a double valve set includes a housing 10, a first nozzle 30 and a second nozzle 40 according to the preferred embodiment of the present invention. Referring to FIG. 3, the second nozzle 40 can be used to transfer the tanked gas 50 to a burner 60 without having to remove the first nozzle 30. Referring to FIG. 4, when used alone, the first nozzle 30 can transfer the natural gas 70 to the burner 60.

The housing 10 includes a chamber 11, an inlet tube 12, an outlet tube 13 and a valve-receiving tube 14. The chamber 11 is in communication with the inlet tube 12, the outlet tube 13 and the valve-receiving tube 14. A thread 131 is formed on an internal side of the outlet tube 13.

The valve 20 includes a portion rotationally inserted in the valve-receiving tube 14. The valve 20 is operable to allow and stop the transfer of the tanked gas or the natural gas to the outlet tube 13 from the inlet tube 12.

A thread 31 is formed on an external side of the first nozzle 30. The thread 31 is engaged with the thread 131 so that the first nozzle 30 is entirely disposed in the outlet tube 13. The first nozzle 30 is adapted to transfer the natural gas 70 to the burner 60.

The second nozzle 40 is formed with a first section and a second section. The external diameter of the first section is smaller than that of the second section so that a shoulder 42 is formed between the first and second sections. A thread 41 is formed on an external side of the first section of the second nozzle 40. The thread 41 is engaged with the thread 131 so that the first section of the second nozzle 40 is disposed in the outlet tube 13. The shoulder 42 is located against a free end 132 of the outlet tube 13. The second nozzle 40 is adapted to transfer the tanked gas 50 to the burner 60.

In another embodiment, the internal diameter of the first section of the second nozzle 40 is larger than that of the second section. A thread is formed on an internal side of the first section of the second nozzle 40. The thread formed on the internal side of the first section of the second nozzle 40 is engaged with a thread formed on an external side of the outlet tube 13 so that the outlet tube 13 is partially disposed in the first section of the second nozzle 40.

Referring to FIG. 3, the double valve set is in a first mode where the first nozzle 30 is disposed in the outlet tube 13 while the second nozzle 40 is connected to the outlet tube 13. In the first mode, the double valve set is adapted to transfer the tanked gas to the burner 60. The tanked gas 50 goes into the housing 10 through the inlet tube 12. The tanked gas 50 goes into the burner 60 from the housing 10 through both of the first nozzle 30 and the second nozzle 40.

Referring to FIG. 4, the double valve set is in a second mode where only the first nozzle 30 is disposed in the outlet tube 13. In the second mode, the double valve set is adapted to transfer the natural gas 70 to the burner 60. The natural gas 70 goes into the housing 10 through the inlet tube 12. The natural gas 70 goes into the burner 60 from the housing 10 through the first nozzle 30 only.

As discussed above, the double valve set is used in the first mode to transfer the tanked gas 50 or in the second mode to transfer the natural gas 70. The double valve set can be switched to the second mode switch from the first mode via disengaging the second nozzle 40 from the outlet tube 13, and the disengagement is easy.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A double valve set for transferring tanked gas and natural gas comprising:

a housing comprising an outlet tube formed thereon, wherein the outlet tube includes a thread formed on an internal side thereof;

a first nozzle disposed in the outlet tube so that when used alone, the first nozzle is adapted to transfer the natural gas, wherein the first nozzle includes a thread formed on an external side thereof and engaged with the thread of the outlet tube; and a second nozzle detachably connected to the outlet tube so that it can be used to transfer the tanked gas without having to remove the first nozzle from the outlet tube, wherein the second nozzle includes a thread formed on an external side of a portion thereof and engaged with the thread of the outlet tube.

* * * * *